United States Patent
Heflin

[15] 3,662,795
[45] May 16, 1972

[54] APPARATUS FOR FORMING STAKES, BRIDGING AND THE LIKE

[72] Inventor: Donald R. Heflin, Fort Collins, Colo.

[73] Assignees: R. Edward Burton, Fort Collins; Duane C. Burton, Boulder, Colo. , part interest to each

[22] Filed: Sept. 25, 1969

[21] Appl. No.: 860,969

[52] U.S. Cl. .................................. 143/38, 143/55, 143/36
[51] Int. Cl. ...................................... B27b 5/00, B27m 3/32
[58] Field of Search ........................... 143/36, 37, 38, 6, 55; 144/242 D, 245 A, 245 B, 30, 89

[56] References Cited

UNITED STATES PATENTS

| | | | |
|---|---|---|---|
| 3,388,727 | 6/1968 | Kotila | 143/38 R |
| 3,534,790 | 10/1970 | Thrasher | 143/55 B |
| 3,452,788 | 7/1969 | Busch | 143/38 |

*Primary Examiner*—Donald R. Schran
*Attorney*—Sheridan, Ross and Burton

[57] ABSTRACT

Apparatus for forming stakes, bridging and the like from new or scrap material particularly from pieces of material of similar but varying cross-sectional dimensions. The apparatus includes a conveyor means having a plurality of laterally disposed pockets longitudinally spaced therealong, three saws one of which is disposed along one side of the conveyor means and the remaining saws being disposed along the other side of the conveyor means, means for securely holding within each pocket during the sawing operation the pieces of material to be disposed therein to prevent vertical movement thereof relative to the saws, shield means disposed in partial encompassing engagement about said pocket as same pass adjacent to saws and about said saws, and means for driving the conveyor means and the saws. Each of the pockets has opposed wall means for limiting longitudinal movement of the pieces of material to be disposed therein relative to the conveyor means. Each of the saws is mounted for pivotal movement about a corresponding line disposed parallel to the longitudinal axis of the conveyor means. The driving means includes a separate electric motor for each saw, each saw being mounted upon the shaft of its corresponding motor. A fourth saw may also be mounted along the other side of said conveyor means. An apparatus for forming stakes is obtained by using a guide rail in lieu of a saw along said one side. An apparatus for forming bridging is obtained by using one saw on each side of said conveyor means.

10 Claims, 12 Drawing Figures

Patented May 16, 1972
3,662,795
3 Sheets-Sheet 1
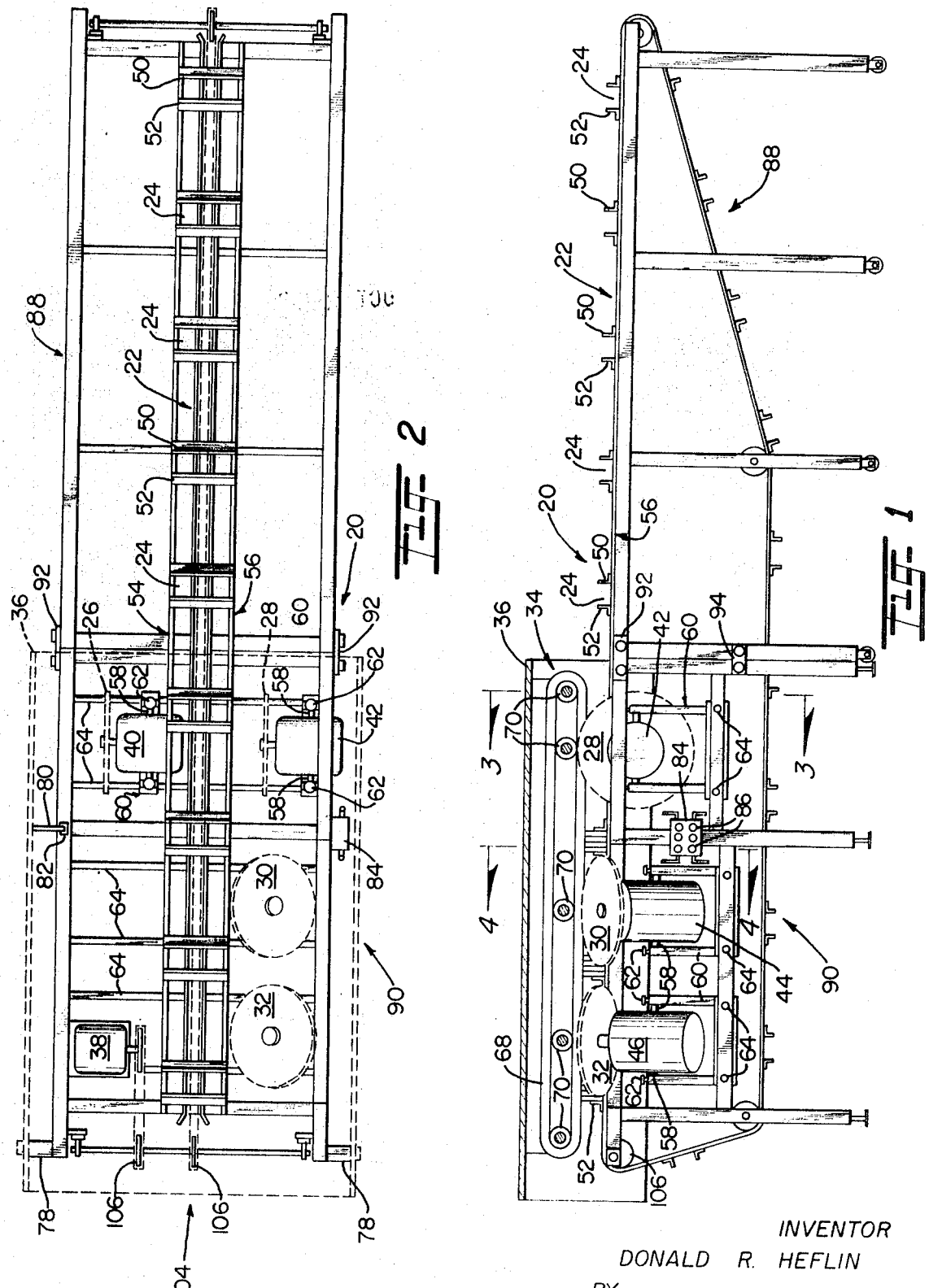
INVENTOR
DONALD R. HEFLIN
BY
ATTORNEY Patented May 16, 1972

INVENTOR
DONALD R. HEFLIN
BY

ATTORNEY

Patented May 16, 1972
3,662,795
3 Sheets-Sheet 3
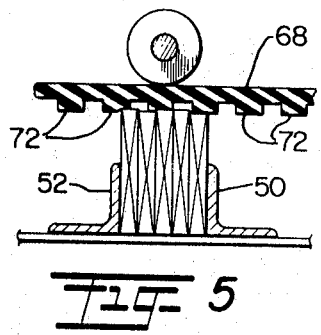
Fig. 5
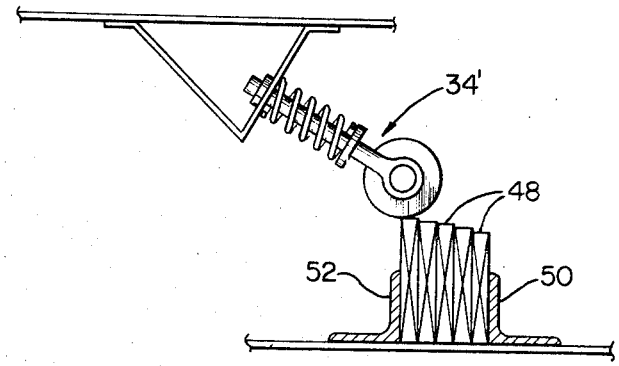
Fig. 6
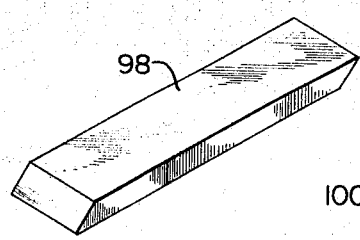
Fig. 9
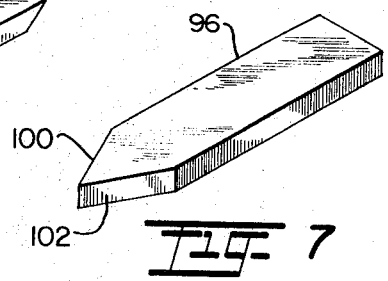
Fig. 7
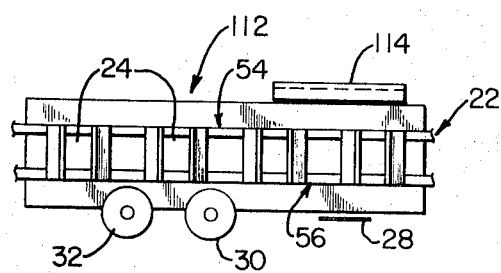
Fig. 12
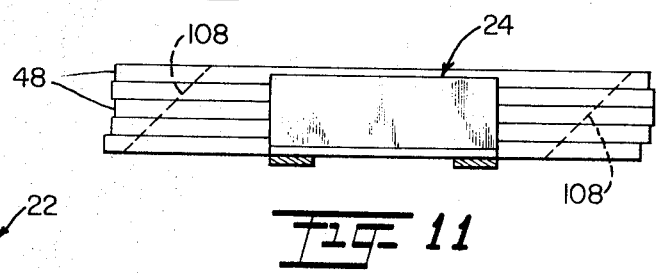
Fig. 11
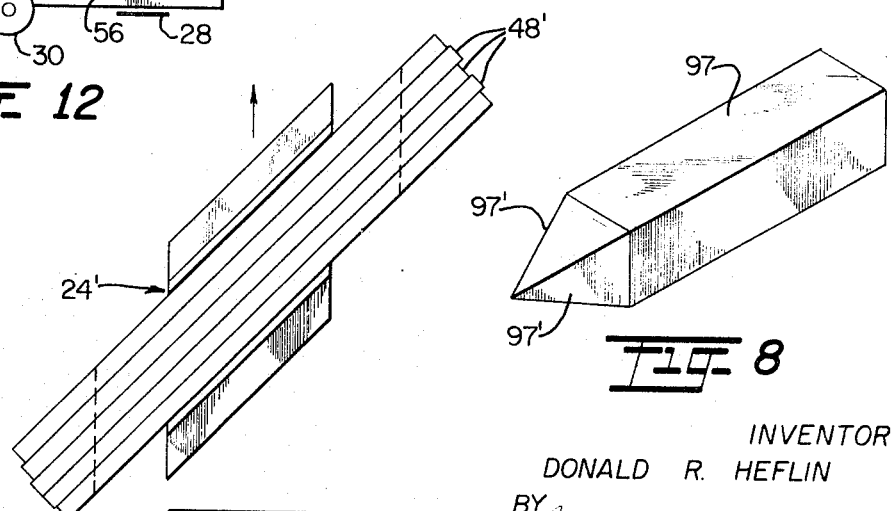
Fig. 10
Fig. 8
INVENTOR
DONALD R. HEFLIN
BY
ATTORNEY

APPARATUS FOR FORMING STAKES, BRIDGING AND THE LIKE

BACKGROUND OF THE INVENTION

Heretofore, various apparatuses have been proposed for forming stakes and the like. However, each of the prior art apparatuses known to the inventor suffered from one or more disadvantages. For example, some of the apparatuses were intermittent in operation and, therefore, operated at a low production rate. Although other apparatuses were continuous in production they also operated at a low production rate. Additionally, none of the apparatuses known to the inventor could handle scrap pieces of lumber having similar but varying cross-sectional dimensions. For example, height dissimilarties among pieces adversely affected the operation of such apparatuses. Other apparatuses were disadvantageous due to the load transmitted by the saw to the bearings supporting the shaft upon which a saw was mounted. Apparatuses illustrious of the prior art are those shown in U.S. Pat. Nos. 1,211,974 and 1,255,060.

SUMMARY OF THE INVENTION

This invention relates to an apparatus for forming stakes, bridging and the like from new or scrap pieces of material, particularly from pieces of material of similar but varying cross-sectional dimensions. The apparatus comprises a conveyor means having a plurality of generally laterally disposed pockets longitudinally spaced therealong, each of the pockets being constructed to receive therein a plurality of pieces of material from which stakes, bridging and the like may be formed, each of the pockets having opposed wall means for limiting longitudinal movement of the pieces of material to be disposed therein relative to the conveyor means, three saws disposed adjacent the sides of a portion of said conveyor means, one of said saws being disposed adjacent one side of the conveyor means and the other saws being disposed adjacent the other side of said conveyor means and longitudinally spaced one from the other, each of the saws being mounted for pivotal movement about a corresponding line disposed parallel to the longitudinal axis of the conveyor means, means for securely holding within each pocket during the sawing operations the pieces of material to be disposed therein to prevent vertical movement thereof relative to the saws, and means for driving said conveyor means of said saws. The apparatus preferably includes a fourth saw disposed adjacent the second side of said conveyor means and longitudinally spaced apart from the other saws disposed along said second side. The fourth saw is mounted for pivotal movement about a corresponding line disposed parallel to the longitudinal axis of the conveyor means. The apparatus includes a shield means mounted to the apparatus and disposed in partial encompassing engagement about said pockets, as same pass adjacent said saws, and about said saws and has for its purpose to intercept parts of the pieces of material which are urged out of the pockets during the sawing operations to prevent same from injuring personnel or equipment located in proximity of the apparatus. Each saw adjacent one of the sides of the conveyor means is mounted for movement in a direction laterally of the conveyor means. The holding means includes an endless belt having a portion thereof disposed in spaced-apart relation to the conveyor means adjacent said saws and constructed to contact, during the sawing operations, a portion of the pieces of material to be disposed within said pockets. Alternatively, the holding means may include a plurality of roller means biased in a direction toward said conveyor means. The driving means includes a separate electric motor for each saw, each saw being monted upon the shaft of its corresponding motor. The pockets of the conveyor means may be mounted such that the longitudinal axis thereof intersects the longitudinal axis of the conveyor means to form an included angle substantially less than 90°. In many instances the angle formed is approximately 45°.

The invention also relates to an apparatus for forming bridging comprising a conveyor means having a plurality of generally laterally disposed pockets longitudinally spaced therealong, each of the pockets constructed to receive therein a plurality of pieces of material from which bridging may be formed, each of the pockets having opposed wall means for limiting longitudinal movement of the pieces of material to be disposed therein relative to the conveyor means, two saws, each of the saws being disposed adjacent a corresponding side of the conveyor means and each being mounted for pivotal movement about a corresponding line disposed parallel to the longitudinal axis of the conveyor means, means for securely holding within each pocket during the sawing operations the pieces of material to be disposed therein to prevent vertical movement relative to the saws, means for driving the conveyor means and saws, said driving means including a separate electric motor for each saw, each saw being mounted upon the shaft of its corresponding motor.

This invention also relates to an apparatus for forming stakes comprising a conveyor means having a plurality of generally laterally disposed pockets longitudinally spaced therealong, each of the pockets being constructed to receive therein a plurality of pieces of material from which stakes may be formed, each of the pockets having opposed wall portions for limiting longitudinal movement of the pieces of material to be disposed therein relative to the conveyor means, a guide rail disposed adjacent a first side of the conveyor means, two saws, each being disposed adjacent a second side of the conveyor means and longitudinally spaced apart one from the other, each saw being mounted for pivotal movement about a corresponding line disposed parallel to the longitudinal axis of the conveyor means, means for securely holding within each pocket during the sawing operations the pieces of material to be disposed therein to prevent vertical movement relative to the saws, and means for driving said conveyor means in said saws, said driving means including a separate electric motor for each saw, each saw being mounted upon the shaft of its corresponding motor. The guide rail is preferably mounted for movement in a direction laterally of the conveyor means.

Accordingly, a principal object of this invention is to provide an improved apparatus for forming stakes, bridging and the like from new or scrap pieces of material, particularly from pieces of material having similar but varying cross-sectional dimensions and pieces of material of different lengths.

Another object of this invention is to provide an improved apparatus as aforedescribed having a greatly improved production rate.

Another object of this invention is to provide an apparatus as aforedescribed in which the saws are directly driven by electric motors rather than being belt driven.

Another object of this invention is to provide an apparatus as aforedescribed which can be used to form either stakes or bridging.

Another object of this invention is to provide an apparatus which can be used to form stakes or bridging of predetermined lengths.

BRIEF DESCRIPTION OF THE DRAWINGS

Further objects and advantages of the invention will become apparent from the following description and claims and from the accompanying drawings wherein:

FIG. 1 is a side elevational view, in partial cross-section of a preferred embodiment of an apparatus constructed in accordance with the subject of this invention;

FIG. 2 is a plan view of the apparatus shown in FIG. 1 with the shield means being shown in dotted lines for the purposes of clarity;

FIG. 5 is a side elevational view showing a portion of the endless belt of the holding means relative to pieces of material disposed within one of the pockets of the conveyor means;

FIG. 6 is a view similar to FIG. 5 showing the roller means of the holding means urging the pieces of material disposed within one of the pockets toward the upstream wall of said pocket;

FIG. 7 is a perspective view of a stake formed by the apparatus of this invention;

FIG. 8 is a perspective view of another stake formed by the apparatus of this invention;

FIG. 9 is a perspective view of a piece of bridging formed by the apparatus of this invention;

FIG. 10 is a plan view of pieces of material disposed within a pocket prior to the formation of bridging;

FIG. 11 is an end elevational view of pieces of material disposed within a pocket prior to the formation of bridging;

FIG. 12 is a schematic view of another embodiment of an apparatus for forming stakes constructed in accordance with this invention.

DESCRIPTION OF PREFERRED EMBODIMENTS

Figure 3:
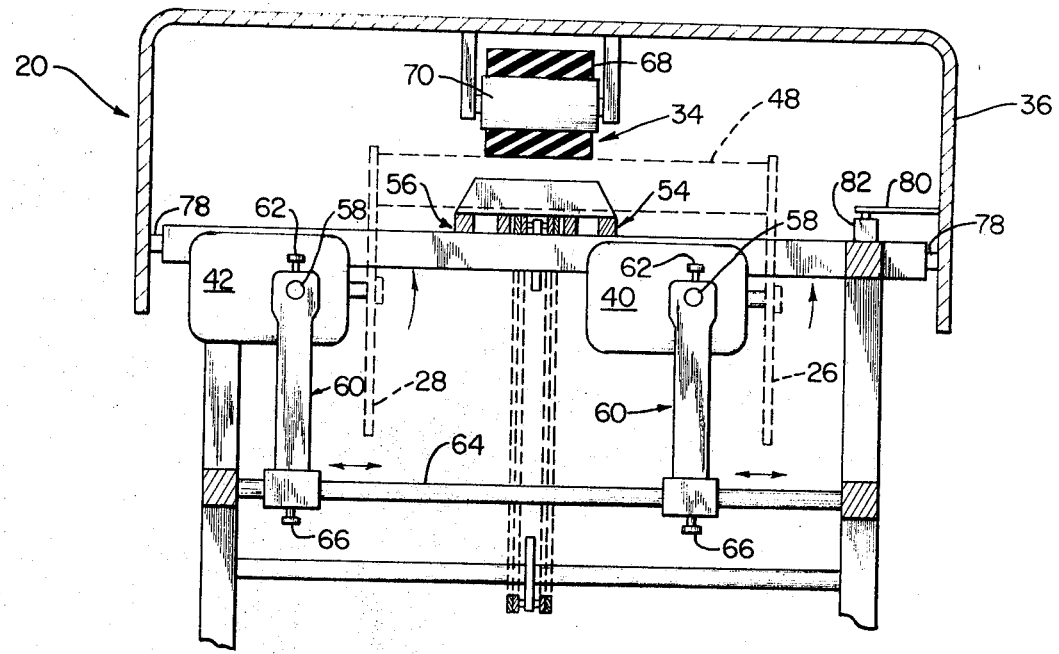
FIG. 3 is an elevational, cross-sectional view taken along line 4—4 of FIG. 1.
Figure 4:
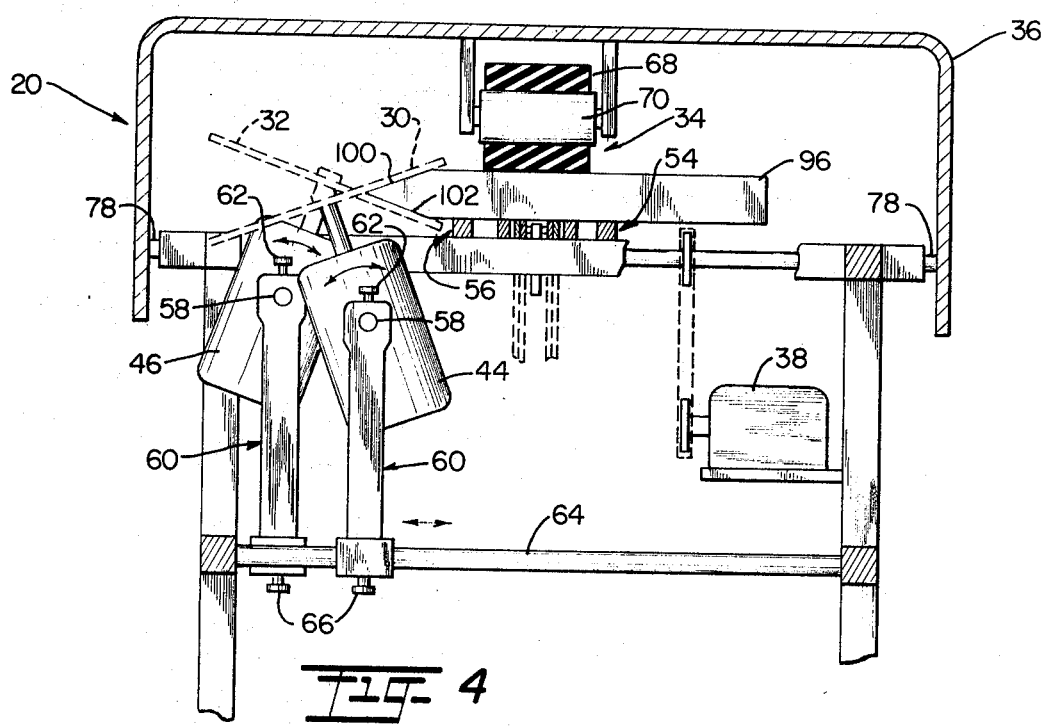
FIG. 4 is an elevational, cross-sectional view taken along line 4—4 of FIG. 1.

Referring now to the drawings, the preferred embodiment of an apparatus 20 constructed in accordance with this invention for forming stakes, bridging and the like is shown in FIGS. 1–5. The apparatus 20 comprises a conveyor means 22 having a plurality of generally laterally disposed pockets 24 longitudinally spaced therealong, four saws 26, 28, 30 and 32, means 34 for securely holding within each pocket 24 during the sawing operations the pieces of material to be disposed therein to prevent vertical movement relative to the saws, shield means 36 pivotally mounted to the apparatus 20 and disposed, in one pivoted position thereon, in partial encompassing engagement about the pockets 24 as same pass adjacent the saws and about the saws, and means for driving said conveyor means 22 and said saws, said driving means including electric motor 38 and separate electric motors 40, 42, 44, and 46 for each of the saws. Each of the saws is mounted upon the shaft of its corresponding motor.

Each of the pockets 24 is constructed to receive therein a plurality of pieces 48 (see also FIGS. 5 and 6) of new or scrap material from which stakes, bridging and the like may be formed. Each of the pockets 24 has opposed wall means 50 and 52 for limiting longitudinal movement of the pieces 48 of material to be disposed therein relative to the conveyor means 22. It has been found that controlling longitudinal movement of the pieces of material disposed within the pockets is advantageous since the production capacity may be substantially increased and wear and tear upon the saws is reduced. By using pockets 24 having opposed wall means 50 and 52 as aforedescribed, the pieces 48 of material disposed therein may be sawed simultaneously at both ends thereof or only at one end thereof without any disruption occurring from the pieces 48 of material twisting within their corresponding pocket.

It will be noted that saw 26 is disposed adjacent a portion of a first side 56 of the conveyor means 22 while the other saws 28, 30 and 32 are disposed adjacent a portion of a second side 58 of the conveyor means 22 and longitudinally spaced one from the other. Each of the electric motors 40, 42, 44 and 46 and its corresponding saw is mounted for pivotal movement about a corresponding line disposed parallel to the longitudinal axis of the conveyor means 22 in order that a surface of a desirable angle of inclination may be cut. Mounting of the electric motors for pivotal movement as aforesaid is schematically shown through the use of a shaft means 58 journaled in the support bracket 60.

Each of the saws adjacent one of the sides of the conveyor means is mounted for movement in a direction laterally of said conveyor means. Preferably, all of the saws are mounted for movement in a direction laterally of the conveyor means. Effecting lateral movement of the saws as aforesaid is accomplished by mounting the support bracket 60 upon a pair of horizontally disposed rods 64. Maintaining a saw in a predetermined lateral position is effected by any suitable means such as set screw means 66.

As shown in FIG. 1–5, the holding means 34 includes an endless belt 68 which is supported for rotation about a plurality of rollers 70. The rollers 70 are in turn, supported by the shield means 36. Each saw has a corresponding roller 70 mounted to apply a force upon the pieces of material as same pass by said saw. The endless belt 68 is preferably formed from a flexible material and, as shown in FIG. 5, has a plurality of boss portions 72 extending outwardly therefrom. The boss portions 72 contact surface portions of the pieces 48 of material within the pocket 24 thereby securely holding said pieces 48 of material within the pocket 24 to prevent vertical movement thereof. Movement of the endless belt 68 is caused by the frictional engagement of belt 68 with the pieces 48 of material disposed within the pocket 24. Thus, since the conveyor means 22 is used to drive the endless belt 68 there is essentially no slippage between the endless belt 68 and the pieces 48 of material disposed within the pockets 24 thereby keeping to a minimum the amount of wear experienced by the endless belt 68.

In FIG. 6 is shown another means 34' for securely holding the pieces of material within the pocket 24. The holding means 34' includes a roller means 74 biased by spring 76 in a generally upstream direction, taken with respect to the direction of travel of the conveyor means, toward the conveyor means. As shown in FIG. 6, the roller means 74 engages surface portions of the pieces 48 of material disposed within the pocket 24. Further, since the outer surface of the roller means 74 is preferably coated with a compressible material, the roller means 74 securely holds the pieces 48 of material within the pocket 24. Preferably there is a roller means 74 associated with each saw. Thus, as each pocket 24 passes adjacent each of the saws, the roller means 74 associated with each saw will operate to secure the pieces 48 of material within the pocket during the swing operations. It will be understood that a single roller means 74 will suffice for the saws 26 and 28 since said saws are disposed on opposite sides of the conveyor means 22.

The shield means 36 is mounted upon shaft stubs 78 for pivotal movement with respect to the apparatus 20. When the shield means 36 is disposed in the position shown in FIGS. 1 and 2, a part thereof contacts a lever 80 which in turn is used to control a switch 82. When the shield means 36 is pivoted upwardly, lever 80 also moves upwardly thereby actuating switch 82 which, in turn, shuts off electric power to all of the motors. The shield means may be suitably mounted to the apparatus to permit adjustment vertically with respect to the conveyor means to compensate for the different distances the pieces 48 of material extend above the conveyor means.

In FIGS. 1 and 2 is shown a control box 84 having a plurality of switches 86. There is a switch 86 for each of the motors and a master switch for controlling electric power to all of the motors.

The apparatus 20 is shown comprising generally two sections 88 and 90 joined together by brackets 92 and 94. The pieces of material are loaded within the pockets 24 as same pass along the upper surface of section 88. Thus, it will be appreciated that the section 88 may be desirably increased or decreased in length as operating circumstances permit. Since all of the saws are mounted within section 90, all of the sawing operations take place as the pieces of material pass along the upper surface of section 90. Construction of the apparatus 20 into two sections 88 and 90 as aforedescribed simplifies packing problems for shipment and renders the apparatus sufficiently portable to permit same to be transported to any remote location having a predetermined quantity of scrap material which can be processed through the apparatus without adversely affecting the overall costs of transporting and using the apparatus.

In FIGS. 7–9 are shown perspective views of two stakes 96 and 97 and a piece of bridging 98. Each of these items are formed by processing pieces of the material through the apparatus 20.

Operation of the apparatus 20 to form stakes 96 is now described. First of all, the saws 26, 28, 39 and 32 are positioned as shown in FIGS. 1-4. Next, the shield means 36 is pivoted downwardly to overlie the saws. One of the switches 86 is actuated to turn on all of the motors. Pieces of material having similar but somewhat different cross-sectional dimensions and lengths equal to or exceeding the length of the stake to be formed are disposed within the pockets 24 passing along the upper surface of section 88. As shown in FIG. 3, the saws 26 and 28 size as to length each of the pieces of material disposed within the pockets 24. The length of the stakes may be increased or decreased by moving saw 26 laterally of the conveyor means 22. The "sized" pieces of material 48 are carried by the conveyor means toward saw 30 which cuts one of the surfaces 100 forming the V-shaped end of the stake 96. Thereafter, the pieces of material are transported by the conveyor means to the saw 32 which cuts the other surface 102 of the V-shaped surface formed on one end of the stake 96. The finished stakes 96 are removed from the end 104 of the apparatus 20 as the conveyor means 22 passes about the rollers 106. Thereafter, the finished stakes 96 are suitably prepared for shipping. It will be appreciated that, except only for the production rate, the apparatus 20 functions efficiently even though each successive pocket 24 is not filled with pieces 48 of material. Further, as a result of the holding means 34, the apparatus 20 functions very adequately even though the individual pockets 24 are not filled to capacity. However, it is to be understood that improved operation is obtained when each pocket is filled to capacity. It will be understood that an apparatus constructed without saw 28 will function to produce stakes; however, it is preferred that the apparatus include saw 28.

The stakes 97 are similar to stakes 96 but have a greater width or depth than stakes 96. Stakes 97 are formed by processing same through the apparatus 20 twice. However, the second time said stakes are processed through the apparatus 20, they are rotated 90° to permit surfaces 97' to be formed.

Operation of the apparatus 20 for forming pieces of bridging 98 is now described. In this connection, reference is also had to FIG. 10 which shows a plurality of pieces 48' of material as same are disposed within a pocket 24'. In FIG. 10, pieces 48' of material are shown disposed or stacked one upon the other. This is in contrast to the arrangement of the pieces of material in side-by-side relationship for forming of the stakes 96, see also FIGS. 5 and 6. One saw on each side of the conveyor means is positioned such that same will cut along one of the corresponding lines 108 as the pieces 48' of material pass by the saws. In this connection, saws 30 and 32 are removed from the apparatus 20 and saws 28 are pivoted to a position for cutting along a corresponding line 108 as aforedescribed. In this manner, the pieces of material are simultaneously "sized" for length and finished as same pass by saws 26 and 28. The finished pieces of bridging 98 are removed from the end 104 of the apparatus 20 in the same manner as the stakes 96 were removed. Suitable means are used to disconnect power from the motors 44 and 46 during the formation of pieces of bridging 98 as aforedescribed.

Formation of pieces of bridging 98 may be effected without pivoting or otherwise moving the saws 26 and 28 of the position as shown in FIGS. 1 and 2. However, in order to accomplish this, the pockets 24' must be mounted upon the conveyor means in the manner shown in FIG. 10, i.e. the longitudinal axis of each pocket 24' intersects the longitudinal axis of the conveyor means to form the included angle substantially less than 90°. In many instances the included angle equals approximately 45°. Additionally, the pieces 48' of material are mounted in side-by-side relation rather than one upon the other as is shown in FIG. 10.

In FIG. 12 is shown a schematic view of another embodiment of a portion of an apparatus 112 constructed in accordance with the subject invention. The apparatus 112 is used to form stakes 96, 97. The apparatus 112 comprises a conveyor means 22 having a plurality of generally laterally disposed pockets 24 longitudinally spaced therealong, a guide rail 114 disposed adjacent a first side 54 of the conveyor means, and three saws 28, 30 and 32. It will be understood that the apparatus 112 also includes suitable holding means, driving means and shield means although none of same are shown in FIG. 12.

The guide rail 114 is mounted for movement laterally of the conveyor means 22 in the same manner that motor 40 and saw 26 are mounted for movement laterally of the conveyor means shown in FIGS. 1 and 2. The guide rail 114 is preferably formed from a section of angle iron.

The operation of the apparatus 112 for forming stakes is similar to the operation of the apparatus 20 except that the guide rail 114 has been substituted for the saw 26. In this connection, the end of the piece of material passing adjacent the guide rail 114 should be generally perpendicular to the longitudinal axis of the piece of material in order to obtain acceptable finished stakes 96. Although the apparatus 112 may be used without saw 28, apparatus 112 preferably includes saw 28.

An apparatus constructed in accordance with this invention may be used to produce approximately 6,000 stakes per hour through the use of two personnel who are used to load the pieces of material into the pockets 24. At this production rate, frequently a third person is required to bring pieces of material up to the apparatus 20 to keep the loading personnel fully supplied. When it is considered that current stake production methods enable two persons using two apparatuses to produce up to approximately 1,250 stakes per hour, it will readily be appreciated that a vastly improved and superior apparatus has been disclosed and described. Additionally, since the saws are not belt driven during the sawing operations, the problems heretofore associated with the life of bearings for the saws has been substantially eliminated. Further, by use of the pockets 24, it is no longer necessary to supply a substantially constant number of pieces of material to the apparatus on a continuous basis since the operation of the apparatus of this invention is not affected by omission of pieces of material from any one of more pockets 24, except only with respect to the production rate of the apparatus. The shield means of this apparatus provides adequate protection to personnel and equipment located in proximity of the apparatus. The apparatus is inexpensive to manufacture and operate and may be readily removed from place to place in order to convert pieces of material heretofore considered only as scrap material into valuable stakes, bridging mitered sections and the like. The apparatus of this invention will enable the conversion of scrap material and thereby reduce problems associated with disposal of same such as air pollution resulting from burning of scrap material and the cost of burying same in a land fill operation.

It is understood that this invention is not limited to the exact embodiments of the apparatus shown and described, which are merely by way of illustration and not limitation, as various other forms and modifications will be apparent to those skilled in the art. For example, an apparatus having one saw disposed on each side of the conveyor means may be converted by substituting a guide rail for one of the saws and moving said saw to the other side of the conveyor means. For this purpose the apparatus preferably has three support brackets 60 rather than two.

I claim:

1. An apparatus for forming stakes, bridging and the like from pieces of material of similar but varying cross-sectional dimensions, said apparatus comprising:
   a. a conveyor means having a plurality of generally laterally disposed pockets longitudinally spaced therealong,
      1. each of said pockets being constructed to receive therein a plurality of pieces of material from which stakes, bridging and the like may be formed, 2. each of said pockets having opposed wall means for limiting longitudinal movement of the pieces of material to be disposed therein relative to said conveyor means;

b. three saws,
1. one of said saws being disposed adjacent a portion of a first side of said conveyor means,
2. the other saws being disposed adjacent a portion of a second side of said conveyor means and longitudinally spaced one from the other,
3. each of said saws being mounted for pivotal movement about a corresponding line disposed parallel to the longitudinal axis of said conveyor means;

c. shield means pivotally mounted to said apparatus and disposed, in one pivoted position thereof, in partial encompassing engagement about said pockets, as same pass adjacent said saws, and about said saws;

d. means for securely holding within each pocket during the sawing operations the pieces of material to be disposed therein to prevent vertical movement relative to said saws, said holding means being mounted upon said shield means, said holding means including an endless belt having a portion disposed to travel in spaced-apart relation to a portion of said conveyor means disposed adjacent said saws, said belt being constructed to contact, during the sawing operation, a portion of the pieces of material to be disposed within said pockets; and e. means for driving said conveyor means and said saws, said driving means including a separate electric motor for each saw, each saw being mounted upon the shaft of its corresponding motor.

2. An apparatus as described in claim 1 including a fourth saw, said fourth saw being disposed adjacent a portion of said second side of said conveyor means and longitudinally spaced apart from the other saws disposed along said second side, said fourth saw being mounted for pivotal movement about a corresponding line disposed parallel to the longitudinal axis of said conveyor means.

3. An apparatus as described in claim 1 in which each saw adjacent one of the sides of said conveyor means is mounted for movement in a direction laterally of said conveyor means.

4. An apparatus for forming stakes, bridging and the like comprising:
a. a conveyor means having a plurality of laterally disposed pockets longitudinally spaced therealong,
1. each of said pockets being constructed to receive therein a plurality of pieces of material from which stakes, bridging and the like may be formed,
2. each of said pockets having opposed wall means for limiting longitudinal movement of the pieces of material to be disposed therein relative to said conveyor means;

b. three saws disposed adjacent the sides of a portion of said conveyor means,
1. one of said saws being disposed adjacent a portion of a first side of said conveyor means,
2. the other saws being disposed adjacent a portion of a second side of said conveyor means and longitudinally spaced one from the other,
3. each of said saws being mounted for pivotal movement about a corresponding line disposed parallel to the longitudinal axis of said conveyor means, c. shield means mounted on said apparatus and disposed in partial encompassing engagement about said pockets as same pass adjacent said saws and about said saws, d. means for securely holding within each pocket during the sawing operations the pieces of material to be disposed therein to prevent vertical movement thereof relative to said saws, said holding means being mounted upon said shield means, said holding means including an endless belt having a portion thereof disposed in spaced-apart relation to said conveyor means adjacent said saws and constructed to contact, during the sawing operations, a portion of the pieces of material to be disposed within said pocket, said endless belt being formed from a flexible material and having a plurality of boss portions extending outwardly therefrom; and e. means for driving said conveyor means and said saws.

5. An apparatus as described in claim 4 including a fourth saw, said fourth saw being disposed adjacent a portion of said second side of said conveyor means and longitudinally spaced apart from the other saws disposed along said second side, said fourth saw being mounted for pivotal movement about a corresponding line disposed parallel to the longitudinal axis of said conveyor means.

6. An apparatus as described in claim 5 in which said driving means includes a separate electric motor for each saw, each saw being mounted upon the shaft of its corresponding motor.

7. An apparatus as described in claim 4 in which each saw adjacent one of the sides of said conveyor means is mounted for movement in a direction laterally of said conveyor means.

8. An apparatus for forming bridging comprising:
a. a conveyor means having a plurality of generally laterally disposed pockets longitudinally spaced therealong,
1. each of said pockets being constructed to receive therein a plurality of pieces of material from which bridging may be formed,
2. each of said pockets having opposed wall means for limiting longitudinal movement of the pieces of material to be disposed therein relative to said conveyor means;

b. two saws,
1. each of said saws being disposed adjacent a corresponding side of said conveyor means,
2. each of said saws being mounted for pivotal movement about a corresponding line disposed parallel to the longitudinal axis of said conveyor means;

c. shield means mounted on said apparatus and disposed in partial encompassing engagement about said pockets as same pass adjacent said saws and about said saws, d. means for securely holding within each pocket during the sawing operations the pieces of material to be disposed therein to prevent vertical movement relative to said saws, said holding means being mounted upon said shield means, said holding means including an endless belt having a portion disposed to travel in spaced-apart relation to a portion of said conveyor means disposed adjacent said saws, said belt being constructed to contact, during the sawing operations, a portion of the pieces of the material to be disposed within the said pockets; and e. means for driving said conveyor means and said saws.

9. An apparatus as described in claim 8 in which the endless belt of said holding means is formed from a flexible material and has a plurality of boss portions extending radially outwardly therefrom.

10. An apparatus for forming stakes, bridging and the like from pieces of material of similar but varying cross-sectional dimensions, said apparatus comprising:
a. a conveyor means having a plurality of generally laterally disposed pockets longitudinally spaced therealong,
1. each of said pockets being constructed to receive therein a plurality of pieces of material from which stakes, bridging and the like may be formed,
2. each of said pockets having opposed wall means for limiting longitudinal movement of the pieces of material to be disposed therein relative to said conveyor means;

b. three saws,
1. one of said saws being disposed adjacent a portion of a first side of said conveyor means,
2. the other saws being disposed adjacent a portion of a second side of said conveyor means and longitudinally spaced one from the other,
3. each of said saws being mounted for pivotal movement about a corresponding line disposed parallel to the longitudinal axis of said conveyor means;

c. shield means pivotally mounted to said apparatus and disposed, in one pivoted position thereof, in partial encompassing engagement about said pockets, as same pass adjacent said saws, and about said saws;

d. means for securely holding within each pocket during the sawing operations the pieces of material to be disposed therein to prevent vertical movement relative to said saws, said holding means being mounted upon said shield means, said holding means including an endless belt having a portion disposed to travel in spaced-apart relation to a portion of said conveyor means disposed adjacent said saws, said belt being constructed to contact, during the sawing operation, a portion of the pieces of material to be disposed within said pockets; and e. means for driving said conveyor means and said saws.

* * * * *